United States Patent
Shen et al.

(10) Patent No.: US 9,697,381 B2
(45) Date of Patent: Jul. 4, 2017

(54) COMPUTING SYSTEM WITH IDENTITY PROTECTION MECHANISM AND METHOD OF OPERATION THEREOF

(71) Applicant: Samsung Electronics Co., Ltd., Suwon-si, Gyeonggi-Do (KR)

(72) Inventors: Yilin Shen, Sunnyvale, CA (US); Fenjiao Wang, Chicago, CA (US); Hongxia Jin, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 43 days.

(21) Appl. No.: 14/186,438

(22) Filed: Feb. 21, 2014

(65) Prior Publication Data
US 2015/0067883 A1 Mar. 5, 2015

Related U.S. Application Data

(60) Provisional application No. 61/873,137, filed on Sep. 3, 2013.

(51) Int. Cl.
| | | |
|---|---|---|
| G06F 7/04 | (2006.01) | |
| G06F 17/30 | (2006.01) | |
| H04N 7/16 | (2011.01) | |
| G06F 21/62 | (2013.01) | |
| G06Q 50/00 | (2012.01) | |

(52) U.S. Cl.
CPC ......... G06F 21/6254 (2013.01); G06Q 50/01 (2013.01)

(58) Field of Classification Search
CPC .............................. G06F 21/6254; G06Q 50/01

USPC ..................................................... 726/22–30
See application file for complete search history.

(56) References Cited

U.S. PATENT DOCUMENTS

| | | | |
|---|---|---|---|
| 7,305,439 B2 | 12/2007 | Qian et al. | |
| 8,136,145 B2 | 3/2012 | Fetterman et al. | |
| 8,468,202 B2 | 6/2013 | Polis et al. | |
| 8,504,910 B2 | 8/2013 | Tarjan | |
| 2004/0049517 A1* | 3/2004 | Singh ................. | G06F 21/6254 |
| 2009/0070412 A1 | 3/2009 | D'Angelo et al. | |
| 2010/0132049 A1 | 5/2010 | Vernal et al. | |
| 2010/0268719 A1 | 10/2010 | Cormode et al. | |
| 2010/0274815 A1 | 10/2010 | Vanasco | |
| 2010/0306834 A1* | 12/2010 | Grandison et al. ............... 726/7 |
| 2011/0173261 A1* | 7/2011 | McCallie et al. ............. 709/204 |
| 2011/0219423 A1 | 9/2011 | Aad et al. | |
| 2012/0209910 A1 | 8/2012 | Svendsen et al. | |

(Continued)

OTHER PUBLICATIONS

S.Bhagat, G.Cormode, G.Krishnamurthy, and D.Srivastava, "Class-based graph anoynymization for social network data", Proc. VLDB Endow., 2(1): 766-777, Aug. 2009.

(Continued)

*Primary Examiner* — Michael S McNally
*Assistant Examiner* — Amie C Lin
(74) *Attorney, Agent, or Firm* — IP Investment Law Group

(57) ABSTRACT

A computing system includes: a communication unit configured to access a target account including a feature; a control unit, coupled to the communication unit, configured to: calculate a comparison result based on the feature, determine an anonymity threshold for conforming the target account with a comparison account, and determine the feature for the target account based on the comparison result and the anonymity threshold for displaying on a device.

20 Claims, 5 Drawing Sheets

(56) References Cited

U.S. PATENT DOCUMENTS

| | | |
|---|---|---|
| 2013/0179977 A1 | 7/2013 | Bhola et al. |
| 2014/0180816 A1* | 6/2014 | Mith et al. .................. 705/14.55 |
| 2014/0237620 A1* | 8/2014 | Ukil ........................ G06F 21/60 726/26 |

OTHER PUBLICATIONS

T.N.Dinh, Y.Shen, and M.T.Thai, "The walls have ears: optimize sharing for visibility and privacy in online social networks", In proceedings of the 21st ACM international conference on information and knowledge management, CIKM '12, pp. 1452-1461, New York, NY, USA, 2012, ACM.

P.Gundecha, G.Barbier, and H.Liu, "Exploiting vulnerability to secure user privacy on a social networking site", In Proceedings of the 17th ACM SIGKDD international conference on Knowledge discovery and data mining, KDD '11, pp. 511-519, New York, NY, USA, 2011. ACM.

M.Hay, G.Miklau, D.Jensen, D.Towsley, and P.Weis, "Resisting structural re-identification in anonymized social networks", Proc. VLDB Endow., 1(1):102-114, Aug. 2008.

A.Smith, "46% of American adults are smartphone owners", Technical report, Pew Research Center, Mar. 2012.

G.Kossinets, J.Kleinberg, and D.Watts, "The structure of information pathways in a social communication network", In KDD, 2008.

"Senate committee hearing on mobile privacy now underway, watch live", Website, 2011. http://www.engadget.com/2011/05/10/ senate-committee-hearing-on-mobile-privacy-/ now-underway-watch-I/.

Federal Trade Commission. "Protecting consumer privacy in an era of rapid change. Mar. 2012", http://ftc.gov/os/2012/03/120326privacyreport.pdf.

K.Gollu, S.Saroiu, and A.Wolman, "A social networking-based access control scheme for personal content," in Proceedings of the 21st ACM Symposium on Operating Systems Principles (SOSP07)—Work-in-Progress Session, 2007.

B. Krishnamurthy and C. Wills, "On the leakage of personally identifiable information via online social networks," ACM, Computer Communication Review, vol. 40, No. 1, pp. 112-117, 2010.

J.Bonneau, J.Anderson, and G.Danezis, "Prying data out of a social network," in First International Conference on Advances in Social Networks Analysis and Mining. Citeseer, 2009.

A.Mislove, B.Viswanath, K.Gummadi, and P.Druschel, "You are who you know: inferring user profiles in online social networks," in Proceedings of the Third International Conference on Web Search and Web Data Mining, WSDM 2010, New York, NY, USA, Feb. 4-6. ACM, 2010, pp. 251-260.

C.Akcora, B.Carminati, E.Ferrari, "Privacy in Social Networks: How Risky is Your Social Graph?:" Data Engineering (ICDE), 2012 IEEE 28th International Conference on, vol., No., pp. 9,19, Apr. 1-5, 2012.

L Cutillo, R.Molva, and M.Onen, "Safebook: A distributed privacy preserving online social network," in World of Wireless, Mobile and Multimedia Networks, 2011 IEEE International Symposium.

K.Graffi, C.Gross, D.Stingl, D.Hartung, A.Kovacevic, and R.Steinmetz, "Lifesocial.kom: A secure and p2p-based solution for online social networks," in Consumer Communications and Networking Conference, 2011 IEEE.

S.Buchegger, D.Schi" oberg, L.H.Vu, and A.Datta, "Peer-SoN: P2P social networking—early experiences and insights," in Proceedings of the Second ACM Workshop on Social Network Systems Social Network Systems 2009, co-located with Eurosys 2009.

R.Narendula, T.Papaioannou, and K.Aberer, "Privacy-aware and highly-available osn profiles," in Enabling Technologies: Infrastructures for Collaborative Enterprises, 2010 19th IEEE International Workshop.

S.Nilizadeh, S.Jahid, P.Mittal, N.Borisov, and A.Kapadia, "Cachet: a decentralized architecture for privacy preserving social networking with caching," in CoNEXT, 2012.

R.Narendula, T.Papaioannou, and K.Aberer, "My3: A highly-available p2p-based online social network," in Peer-to-Peer Computing, 2011 IEEE International Conference.

Vodafone Group. (2011) Onesocialweb—creating a free, open, and decentralized social networking platform. [Online]. Available: http://onesocialweb.org/.

Diaspora Inc. (2012) https://joindiaspora.com/. [Online]. Available: http://onesocialweb.org/.

F.Raji, A.Miri, M.Jazi, and B.Malek, "Online social network with flexible and dynamic privacy policies," in Computer Science and Software Engineering, 2011 CSI International Symposium.

R.Baden, A.Bender, N.Spring, B.Bhattacharjee, and D.Starin, "Persona: an online social network with user defined privacy," in Proceedings of the ACM SIGCOMM 2009 conference on Data communication.

M.Durr, M.Maier, and F.Dorfmeister, "Vegas—a secure and privacy-preserving peer-to-peer online social network," in Social Computing, 2012 IEEE Fourth International Conference.

L.Schwittmann, C.Boelmann, M.Wander, and T.Weis, "SoNet—Privacy and Replication in Federated Online Social Networks", 5th International Workshop on Hot Topics in Peer-to-peer Computing and Online Social Networking, HotPOST 2013, held in conjunction with the 33rd International Conference on Distributed Computing Systems, ICDCS 2013, Philadelphia, Pennsylvania, USA, Jul. 8-11, 2013.

A.Narayanan, V.Shmatikov, "De-anonymizing Social Networks," Security and Privacy, 2009 30th IEEE Symposium on , vol., No., pp. 173,187, May 17-20, 2009 doi: 10.1109/SP.2009.22.

B.Krishnamurthy, K.Naryshkin, and C.Wills, "Privacy leakage v. Protection measures: the growing disconnect", http://w2spconf.com/2011/papers/privacyVsProtection.pdf.

\* cited by examiner

COMPUTING SYSTEM WITH IDENTITY PROTECTION MECHANISM AND METHOD OF OPERATION THEREOF

CROSS-REFERENCE TO RELATED APPLICATION

This application claims the benefit of U.S. Provisional Patent Application Ser. No. 61/873,137 filed Sep. 3, 2013, and the subject matter thereof is incorporated herein by reference thereto.

TECHNICAL FIELD

An embodiment of the present invention relates generally to a computing system, and more particularly to a system with identity protection mechanism.

BACKGROUND

Modern consumer and industrial electronics, especially devices such as computing systems, cellular phones, portable digital assistants, and combination devices are providing increasing levels of functionality to support modern life including online social networks. Research and development in the existing technologies can take numerous different directions.

As users become more empowered with the growth in computing, various uses begin to take advantage of this new device space. One such advancement has been protecting sensitive or private information. However, the rapid growth in consumer electronics and the increase in unauthorized access and usage of personal data have presented new challenges for the users.

Thus, a need still remains for a computing system with identity protection mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: a communication unit configured to access a target account including a feature; a control unit, coupled to the communication unit, configured to: calculate a comparison result based on the feature, set an anonymity threshold for conforming the target account with a comparison account, and determine the feature for the target account based on the comparison result and the anonymity threshold for displaying on a device.

An embodiment of the present invention provides a method of operation of a computing system including: accessing a target account including a feature; calculating a comparison result based on the feature; setting an anonymity threshold for conforming the target account with a comparison account; and determining the feature for the target account based on the comparison result and the anonymity threshold for displaying on a device.

An embodiment of the present invention provides a non-transitory computer readable medium including instructions for operating a computing system including: accessing a target account including a feature; calculating a comparison result based on the feature; setting an anonymity threshold for conforming the target account with a comparison account; and determining the feature for the target account based on the comparison result and the anonymity threshold for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
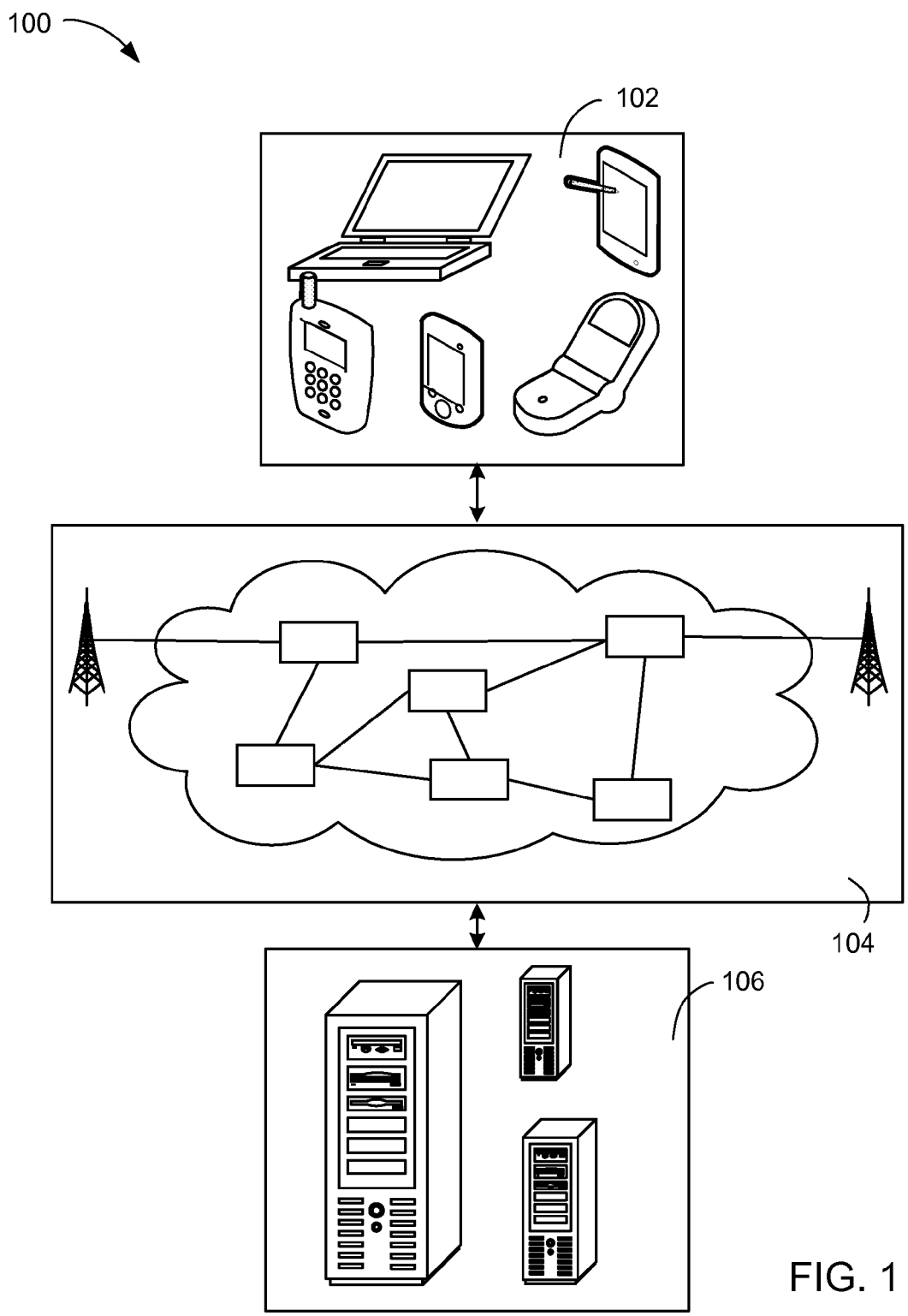
FIG. 1 is a computing system with identity protection mechanism in an embodiment of the present invention.

The following embodiments of the present invention can be used to protect user information. A target account associated with the user can be analyzed and compared to instances of content information existing on various instances of social network service, associated with the user, associated with different users, or a combination thereof. The comparison can result in a comparison result, an anonymity rating, or a combination thereof for a specific instance of a feature.

The embodiments of the present invention can generate a protective solution corresponding to the feature based on the comparison result, the anonymity rating, or a combination thereof. The protective solution can be implemented to achieve k-anonymity for the target account or the user amongst k amount of different accounts or users. The anonymity can prevent an attacker from inferring user's identity and information using information accessible across various sites.

The anonymity rating and the feature provides increased security for the user. The protective solution also provides increased protection for the user's information.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes filtering signals, decoding symbols, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with identity protection mechanism in an embodiment of the present invention. The computing system 100 includes a first device 102, such as a mobile device including a cellular phone or a notebook computer, connected to a network 104.

The first device 102 can be a client or a server. For example, the first device 102 can be of any of a variety of devices, such as a smartphone, a cellular phone, personal digital assistant, a tablet computer, a notebook computer, or other multi-functional display or entertainment device. The first device 102 can couple, either directly or indirectly, to the network 104 for exchanging information with other devices.

The network 104 is a system of wired or wireless communication devices that are connected to each other for enabling communication between devices. For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The network 104 can span and represent a variety of network types and network topologies. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the network 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

Device users (not shown) can communicate with each other or access or create information using devices including text, images, symbols, location information, and audio, as examples. The users can be individuals or enterprise companies. The information can be created directly from a user or operations performed on these information to create more or different information.

The network 104 can include a second device 106 for directly linking and communicating with the first device 102. The second device 106 can receive wireless signals from the first device 102, transmit signals to the first device 102, process signals, or a combination thereof. The second device 106 can also relay signals between other base stations, components within the network 104, or a combination thereof.

The second device 106 can be any of a variety of centralized or decentralized computing devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a recording device, such as a camera or video camera, or a combination thereof. In another example, the second device 106 can be a server at a service provider or a computing device at a transmission facility.

For illustrative purposes, the computing system 100 is described with the first device 102 as a consumer device or a portable device, and with the second device 106 as a stationary or an enterprise device. However, it is understood that the first device 102 and the second device 106 can be any variety of devices. For example, the first device 102 can be a stationary device or an enterprise system, such as a television or a server. Also for example, the second device 106 can be a consumer device or a portable device, such as a smart phone or a wearable device.

The first device 102, the second device 106, or a combination thereof can connect to and communicate with other devices, such as other mobile devices, servers, computers, telephones, or a combination thereof. For example, the first device 102, the second device 106, or a combination thereof can communicate with other devices by transmitting signals, receiving signals, processing signals, or a combination thereof and displaying a content of the signals, audibly recreating sounds according to the content of the signals, processing according to the content, such as storing an application or updating an operating system, or a combination thereof. The first device 102, the second device 106, or a combination thereof can couple, either directly or indirectly, to the network 104 for exchanging information with each other or other devices.

For illustrative purposes, the computing system 100 is described with the first device 102 as a portable multi-functional device, although it is understood that the first device 102 can be different types of devices. For example, the first device 102 can also be a workstation or a multi-media presentation. A multi-media presentation can be a presentation including sound, a sequence of streaming images or a video feed, text or a combination thereof.

For further illustrative purposes, the computing system 100 is described with the second device 106 as a computing device and as a server, although it is understood that the second device 106 can be different types of devices as described above. Also for illustrative purposes, the computing system 100 is shown with the second device 106 and the first device 102 as end points of the network 104, although it is understood that the computing system 100 can have a different partition between the first device 102, the second device 106, and the network 104. For example, the first device 102, the second device 106, or a combination thereof can also function as part of the network 104.

Figure 2:
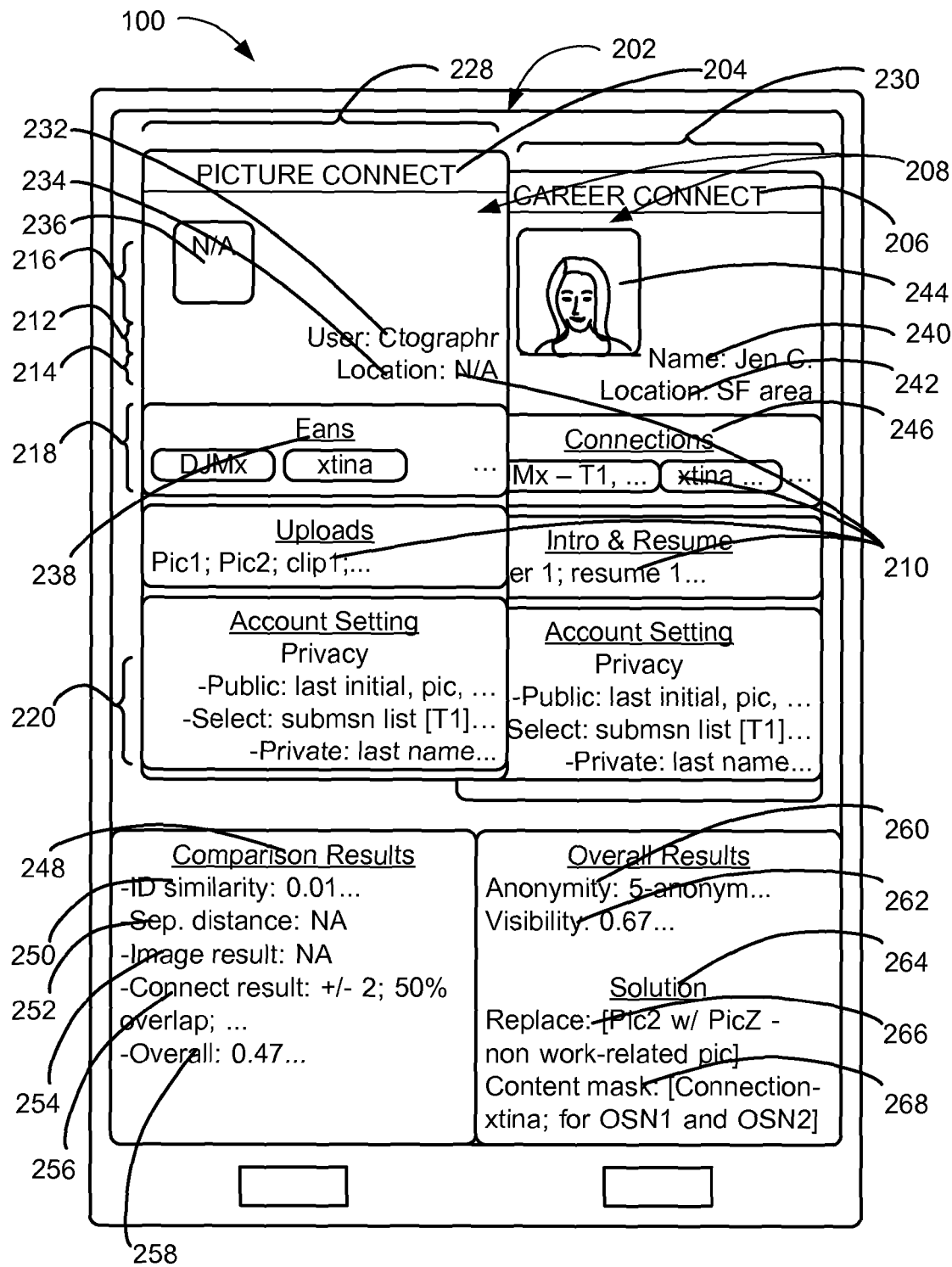
FIG. 2 is an example display of the first device and the third device.

Referring now to FIG. 2, therein is shown an example display of the first device 102. The first device 102 can show a social network service 202. The social network service 202 is a social structure or a set of connections between a set of social actors or users. The social network service 202 can include a set of dyadic ties between the social actors or the users.

The computing system 100 can process multiple instances of the social network service 202. For example, the first device 102 can show a first social site 204 and a second social site 206. As a more specific example, the computing system 100 can process multiple instances of the social network service 202 such as Facebook™, Twitter™, LinkedIn™, Pinterest™, Snapchat™, Tumblr™, Line™, WhatsApp™, Foursquare™, or other similar services.

The social network service 202 can include content information 208. The content information 208 is material associated with a specific user or a specific account for a specific instance of the social network service 202. For example, the content information 208 can include a profile, a connection list, a webpage, a message authored by the user or other users, schedules or dates, or a combination thereof for the user at one instance of the social network service 202.

The content information 208 can include multiple different types of information. For example, the content information 208 can include a feature 210. The feature 210 is a unit of information. The feature 210 can include a letter, a number, a pointer or a link, an address, visual data, audible data, an instruction, or a combination thereof. The feature 210 can include a unit of information corresponding to a known or a commonly accepted category, a logical or an abstract meaning or significance, or a combination thereof.

For example, the feature 210 can include profile information or structural information provided by the user or other information associated with the user, such as an account identification 212, an account location 214, an account image 216, an account connection 218, or a combination thereof. Also for example, the feature 210 can include a keyword or a link in user submitted content, such as a note, a journal or a blog entry, a link, a review, description for a photograph or a digital image, or a combination thereof.

The account identification 212 is information for proving or recognizing a person or an entity associated with the content information 208. The account identification 212 can represent the profile information. The account identification 212 can include a name, a number, an address, or a combination thereof.

For example, the account identification 212 can include a name, an account number, a serial number, a screen name, a login name, a nickname, a title, a moniker, a nickname, or a combination thereof representing the owner, the author, the subject, or a combination thereof for the content information 208. Also for example, the account identification 212 can include contact information, such as a phone number or an email address.

The account location 214 is a geographic location or area associated with the person or the entity associated with the content information 208. The account location 214 can represent the profile information. The account location 214 can include an address, a set of coordinates, an area, such as a city or a building, or a combination thereof. For example, the account location 214 can include a representation of a sign-in location, a originating location, a residence, a work location, a residence, a location of an activity or an update, or a combination thereof.

The account image 216 is visual data associated with the person or the entity associated with the content information 208. The account image 216 can represent the profile information. The account image 216 can be a representation of the person or the entity, data sourced or used by the person or the entity, or a combination thereof. For example, the account image 216 can include a profile picture, a video or an image uploaded by the user of the account, or a combination thereof.

The account connection 218 is a representation of a separate person or a separate entity, different from and associated with the person or the entity represented by corresponding instance of the content information 208. The account connection 218 can represent the structural information.

For example, the account connection 218 can include representation of a friend, a contact, or a different person or a different entity having a relationship to the user or the entity for the content information 208. As a more specific example, the account connection 218 can include a friend list, a contact list, an address book, an access list, a link to a different instance of the content information 208 representing the different person or the different entity, a set thereof, or a combination thereof included in the content information 208 representing or controlled by the user.

The content information 208 can include a privacy rating 220, such as public information 222, selective information 224, or private information 226. For example, a portion of the content information 208, such as the account image 216 can be the public information 222, where any user can view the information, while a different portion can be the selective information 224, such as the account connection 218 or any messages in the content information 208, allowing only selected parties or devices to view the information. Also for example, the content information 208 can include the private information 226, such as personal contact information or log-in information, only accessible to the user, the owner, the author, or a combination thereof for the content information 208.

The computing system 100 can process a target account 228 for a user with a comparison account 230. The target account 228 can be an instance of the content information 208 associated with the user on one instance of the social network service 202. For example, the target account 228 can include the content information 208 representing the user, authored by the user, owned by the user, or a combination thereof on the first social site 204.

The comparison account 230 can be a separate instance of the content information 208 different from the target account 228. The comparison account 230 can be associated with the user or a separate user, different from the user. The comparison account 230 can be on a same or a different instance of the social network service 202 as the target account 228.

The target account 228 can include a target identification 232, a target location 234, a target image 236, a target connection 238, or a combination thereof. The target identification 232 is the account identification 212 associated with the user of the target account 228. The target location 234 is the account location 214 associated with the user of the target account 228. The target image 236 is the account image 216 associated with the user of the target account 228. The target connection 238 is the account connection 218 associated with the user of the target account 228.

The comparison account 230 can include a comparison identification 240, a comparison location 242, a comparison image 244, a comparison connection 246, or a combination thereof. The comparison identification 240 is the account identification 212 associated with the comparison account 230. The comparison identification 240 can be the same as, similar to, or different from the target identification 232.

The comparison location 242 is the account location 214 associated with the comparison account 230. The comparison location 242 can be the same as, similar to, or different from the target location 234. The comparison image 244 is the account image 216 associated with the comparison account 230. The comparison image 244 can be the same as, similar to, or different from the target image 236.

The comparison connection 246 is the account connection 218 associated with the comparison account 230. The comparison connection 246 can be the same as, similar to, or different from the target connection 238.

The computing system 100 can process a target account 228 for a user with a comparison account 230 by generating, determining, calculating, or a combination thereof for a comparison result 248. The comparison result 248 is a processing outcome or result corresponding to comparing instances of the content information 208.

The comparison result 248 can include a degree of match between instances of the content information 208 or between portions therein. The comparison result 248 can represent a measure of a similarity or difference between instances of the content information 208 or between portions therein. For example, the comparison result 248 can represent a similarity or a difference between the target account 228 and the comparison account 230, between portions therein, or a combination thereof.

The comparison result 248 can include various different types of information. For example, the comparison result 248 can include an identification similarity 250, a separation distance 252, an image comparison result 254, a connection result 256, an overall assessment 258, or a combination thereof.

The identification similarity 250 is a representation of a similarity or a difference in instances of the account identification 212 corresponding to instances of the content information 208. The identification similarity 250 can include a quantified result or a measure of similarity or difference between the target identification 232 and the comparison identification 240. The identification similarity 250 can be based on comparing strings.

For example, the identification similarity 250 can include a Jaro-Winkler distance or a Levenshtein distance. Also for example, the identification similarity 250 can be a number between 0 and 1, with higher numbers representing higher similarity between instances of the account identification 212.

The separation distance 252 can be a measure of physical distance between instances of the account location 214. The separation distance 252 can include a physical distance separating the target location 234 and the comparison location 242. The separation distance 252 can represented as a Euclidean distance between the two corresponding geographic locations or areas.

The image comparison result 254 is a measure of similarity between instances of the account image 216 or portions therein. The image comparison result 254 can be a result of comparing the target image 236 and the comparison image 244.

For example, the image comparison result 254 can include a comparison between faces using markers in corresponding images. Also for example, the image comparison result 254 can be a comparison between images for determining common items or common locations associated with the compared images.

Also for example, the image comparison result 254 can be based on a greyscale comparison of the images. The greyscale images can generate an image histogram, which can represent a tonal distribution. The image comparison result 254 can be the difference in the histograms between the images.

The connection result 256 can be a representation of a similarity between instances of the account connection 218. The connection result 256 can include a result of a comparison between the target connection 238 and the comparison connection 246. The connection result 256 can be a representation of an overlap between social or professional contacts, accounts or profiles corresponding to the contacts, or a combination thereof.

For example, the target account 228, such as a social networking page or an information sharing account, can include a set of connections, such as contacts connected to the page or an address book. The comparison connection 246 can include a different set of connections. The connection result 256 can include an absolute difference in the total numbers of connections. The connection result can also include an instance or a total amount of common friends, contacts, acquaintances, colleagues, or a combination thereof between instances of the account connection 218.

The overall assessment 258 can be a comprehensive representation of similarity or an overlap between multiple instances of the content information 208. The overall assessment 258 can include a combination of one or more from the identification similarity 250, the separation distance 252, the image comparison result 254, and the connection result 256.

The computing system 100 can process an anonymity rating 260, a counter rating 262, a protective solution 264, or a combination thereof. The computing system 100 can process the counter rating 262, the anonymity rating 260, the protective solution 264, or a combination thereof based on the comparison result 248.

The anonymity rating 260 is a representation of similarity or distinctions between the user's information and other available information. The anonymity rating 260 can be based on an inability to distinguish the user or the target account 228 from one or more instances of another user or the comparison account 230. The anonymity rating 260 can be a value representing a degree of similarity between users or instances of the content information 208, a number of users or instances of the content information 208 sharing similarities, an abstract level based on thresholds and evaluations, or a combination thereof.

For illustrative purposes, the anonymity rating 260 can be associated with a crossing user 'u' in the first social site 204 and the second social site 206. The anonymity rating 260 can represent the user u reaching k-anonymity when there exists 'k' or more users in the second social site 206, such that the comparison result 248 between instances of the content information 208 for the user u in the first social site 204 and the second social site 206 is no larger than between u and k amount of other users of the second social site 206.

The counter rating 262 is a representation of a characteristic related to the anonymity rating 260. The counter rating 262 can include representation of the characteristic adversely related to the anonymity rating 260. The counter rating 262 can include a score, a corresponding category, a probability, or a combination thereof for representing the characteristic.

For example, the counter rating 262 can include a visibility measure, a sensitivity measure, a utility measure, or a combination thereof. Also for example, the counter rating 262 can represent a characteristic or a quality of the feature 210 that may diminish as the anonymity rating 260 goes up for the content information 208 or the feature 210 therein.

The visibility measure is a representation of noteworthiness or attraction attributed to the user or the user's instance of the content information 208. The visibility measure can be based on an ability to distinguish or recognize an instance of the feature 210 or overall instances of the content information 208 associated with the user. The visibility measure can include a probability.

For example, the counter rating can include a value representing a likelihood of the user or the user's instance of the content information 208 or the feature 210 therein being found in a search. Also for example, the counter rating can include a desirability or a popularity associated with the user, the content information 208 associated therewith, the feature 210 therein, or a combination thereof. The computing system 100 can process the information for maximizing the visibility measure.

The sensitivity measure can be similar to the counter rating and represent an amount of potential effect produced by accessing or processing the feature 210. For example, the sensitivity measure can be a difference between a value for the feature 210, such as based on a generalization, and an actual trait or a detailed characteristic of the user. Also for example, the sensitivity measure can be a representation of an effectiveness or a weight for the feature 210 for an attack process or a protection process given an intent or a purpose of the user, context, nature of the social network service 202, or a combination thereof. The computing system 100 can process the information for minimizing the sensitivity measure.

The utility measure can be similar to the counter rating and represent a degree of usefulness to the user. For example, the utility measure can be a degree of connection or similarity between an inferred or a received intent of the user and the content information 208. Also for example, the utility measure can be a representation of importance for the feature 210 given an intent or a purpose of the user, context, nature of the social network service 202, or a combination thereof. The computing system 100 can process the information for maximizing the utility measure.

The protective solution 264 is information or an added processing of information to increase security for the selective information 224 or the private information 226. For example, the protective solution 264 can include a replacement content 266, a content mask 268, or a combination thereof.

The replacement content 266 is information generated by the computing system 100 to replace the content information 208 or a portion therein. The replacement content 266 can include information for creating an inference or a similarity between multiple instances of the content information 208. The computing system 100 can replace the content information 208 or a portion therein with the replacement content 266 such that a different user or a device cannot differentiate between the target account 228 associated with the user and one or more different instances of the content information 208.

The content mask 268 is a process for hiding or restricting access or availability of a portion within the content information 208. The content mask 268 can include hiding certain data, changing the privacy rating 220 associated with the certain data, such as from the public information 222 to the selective information 224, or a combination thereof.

A different user or a different device can be used as an attacker against the user or an instance of the content information 208. For example, the attacker can use the public information 222 from the target account 228 and determine or gain access to personal or sensitive data intended to be protected from or unavailable to the attacker using a training set.

The training set is a collection of data used to discover predictive relationships or potentially predictive relationships. The training set can be a set of input vector and an answer vector for determining an information associated with the target account 228, predicting a relationship between information or between instances of the content information 208, or a combination thereof.

The attacker can use a machine learning algorithm using the public information 222 and other available or linked data to infer or predict the selective information 224 or the private information 226 associated with the user. The attacker can use the training set including existing linked users, such as the target connection 238, randomly selected unmatched user pairings starting from the target connection 238, or a combination thereof.

The attacker can infer a connection between the user and analyzed information using a predefined classifier and the training set. The additionally associated information to the user can be a prediction or an estimation of undisclosed information of the user, such as the selective information 224 or the private information 226.

The computing system 100 can process the content information 208, generate the protective solution 264, implement the protective solution 264, or a combination thereof to negate or prevent hacking attempts from the attacker. The computing system 100 can use the process to protect sensitive or private information associated with the target account 228. Further, the computing system 100 can use the process to preserve or balance visibility, sensitivity, desired availability, or a combination thereof intended by the user. Details regarding the protection process will be described below.

Figure 3:
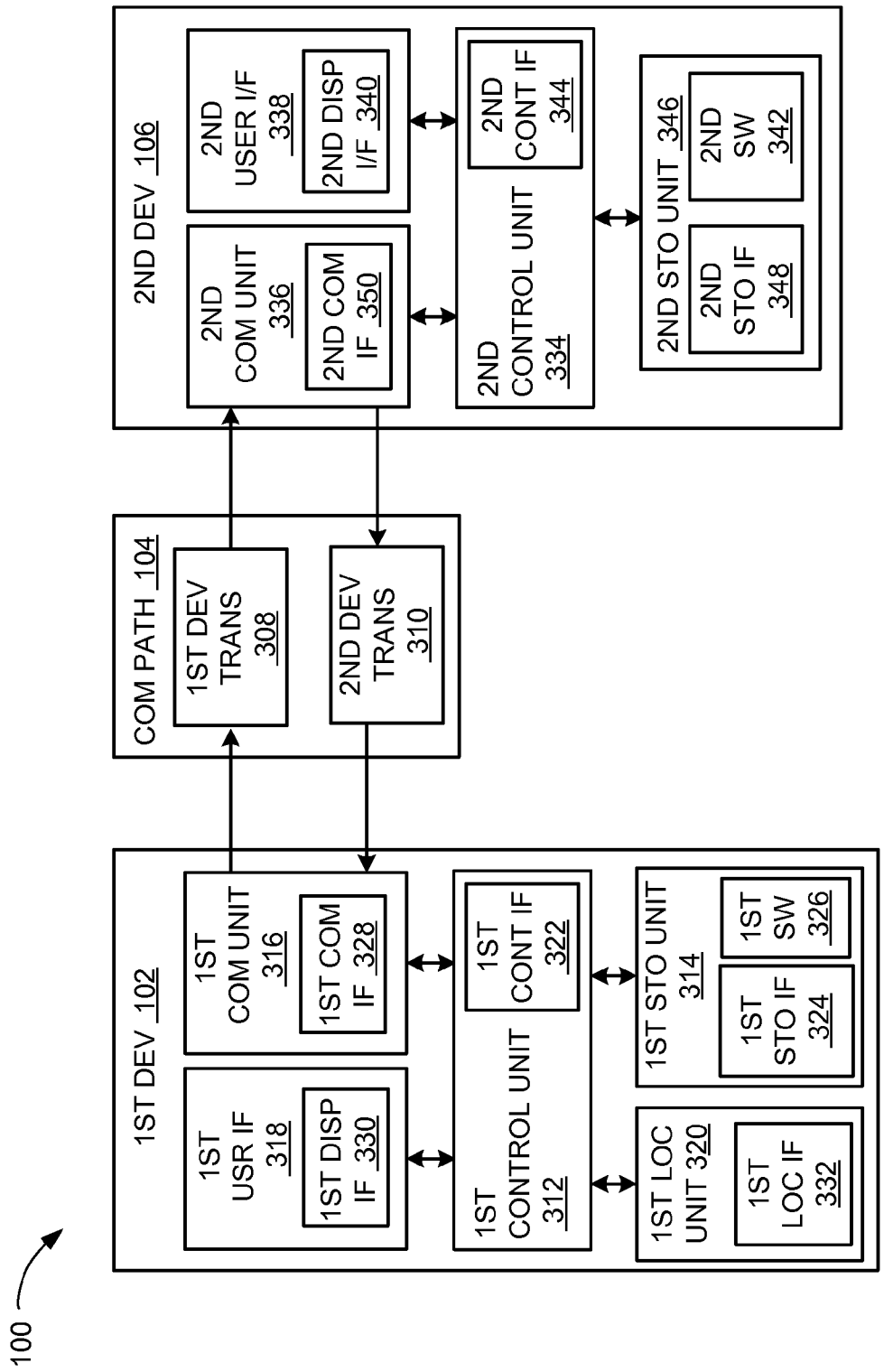
FIG. 3 is an example block diagram of the computing system.

Referring now to FIG. 3, therein is shown an exemplary block diagram of the computing system 100. The computing system 100 can include the first device 102, the network 104, and the second device 106. The first device 102 can send information in a first device transmission 308 over the network 104 to the second device 106. The second device 106 can send information in a second device transmission 310 over the network 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, a first user interface 318, and a first location unit 320. The first control unit 312 can include a first control interface 322. The first control unit 312 can execute a first software 326 to provide the intelligence of the computing system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the first storage unit 314 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, a different device, an attachment, such as a peripheral device or a desktop computer, the network 104, or a combination thereof.

The first communication unit 316 can also function as a communication hub allowing the first device 102 to function as part of the network 104 and not limited to be an end point or terminal unit to the network 104. The first communication unit 316 can include active and passive components, such as microelectronics or an antenna, for interaction with the network 104.

The first communication unit 316 can include a baseband device or component, a modem, a digital signal processor, or a combination thereof for transmitting, formatting, receiving, detecting, decoding, further processing, or a combination thereof for communication signals. The first communication unit 316 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 316 can further include one or more portions for storing information, such as cache or RAM memory, registers, or a combination thereof.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device. The first display interface 330 can include a display, a projector, a video screen, a speaker, or any combination thereof.

The first control unit 312 can operate the first user interface 318 to display information generated by the computing system 100. The first control unit 312 can also execute the first software 326 for the other functions of the computing system 100, including receiving location information from the first location unit 320. The first control unit 312 can further execute the first software 326 for interaction with the network 104 via the first communication unit 316.

The first location unit 320 can generate location information, current heading, current acceleration, and current speed of the first device 102, as examples. The first location unit 320 can be implemented in many ways. For example, the first location unit 320 can function as at least a part of the global positioning system, an inertial computing system, a cellular-tower location system, a pressure location system, or any combination thereof. Also, for example, the first location unit 320 can utilize components such as an accelerometer or GPS receiver.

The first location unit 320 can include a first location interface 332. The first location interface 332 can be used for communication between the first location unit 320 and other functional units in the first device 102. The first location interface 332 can also be used for communication external to the first device 102.

The first location interface 332 can receive information from the other functional units or from external sources, or can transmit information to the other functional units or to external destinations. The external sources and the external destinations refer to sources and destinations external to the first device 102.

The first location interface 332 can include different implementations depending on which functional units or external units are being interfaced with the first location unit 320. The first location interface 332 can be implemented with technologies and techniques similar to the implementation of the first control unit 312.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, a second user interface 338, and a second storage unit 346.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the computing system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the computing system 100, including operating the second communication unit 336 to communicate with the first device 102 over the network 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations external to the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the computing system 100 is shown with the second storage unit 346 as a single hierarchy storage system, although it is understood that the computing system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the second storage unit 346 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the network 104.

The second communication unit 336 can also function as a communication hub allowing the second device 106 to function as part of the network 104 and not limited to be an end point or terminal unit to the network 104. The second communication unit 336 can include active and passive components, such as microelectronics or resistors, for interaction with the network 104.

The second communication unit 336 can include a baseband device or component, a modem, a digital signal processor, or a combination thereof for transmitting, formatting, receiving, detecting, decoding, further processing, or a combination thereof for communication signals. The second communication unit 336 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 316 can further include one or more portions for storing information, such as cache or RAM memory, registers, or a combination thereof.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the network 104 to send information to the second device 106 in the first device transmission 308. The second device 106 can receive information in the second communication unit 336 from the first device transmission 308 of the network 104.

The second communication unit 336 can couple with the network 104 to send information to the first device 102 in the second device transmission 310. The first device 102 can receive information in the first communication unit 316 from the second device transmission 310 of the network 104. The computing system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 102 and the second device 106. It is understood that the first device 102 and the second device 106 can operate any of the modules and functions of the computing system 100.

Figure 4:
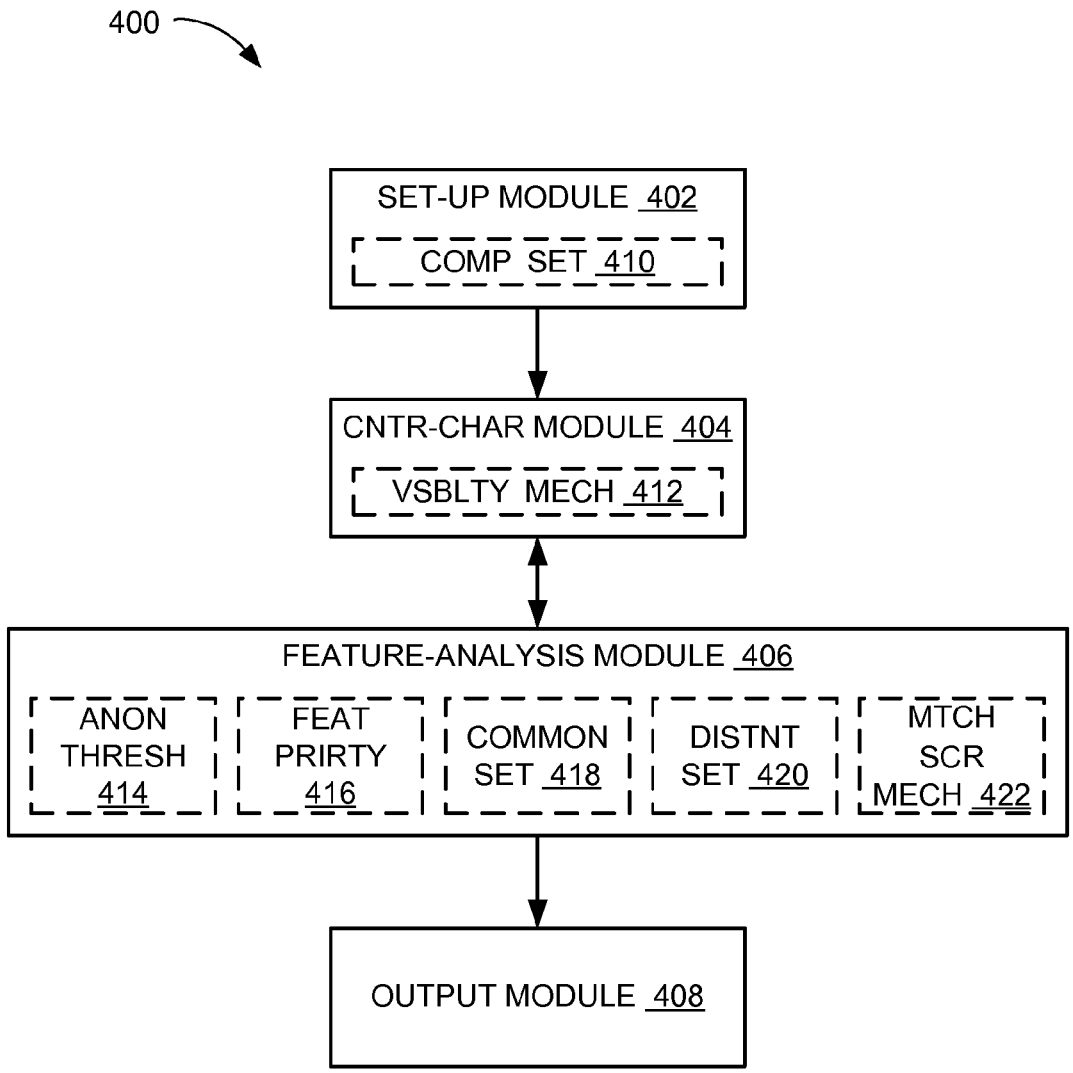
FIG. 4 is a control flow of the computing system.

Referring now to FIG. 4, therein is shown a control flow 400 of the computing system 100 of FIG. 1. The computing system 100 can include a set-up module 402, a counter-characteristic module 404, a feature-analysis module 406, an output module 408, or a combination thereof.

The set-up module 402 can be coupled to the counter-characteristic module 404, and the counter-characteristic module 404 can be further coupled to the feature-analysis module 406. The feature-analysis module 406 can be further coupled to the output module 408.

The modules can be coupled to each other in a variety of ways. For example, modules can be coupled by having the input of one module connected to the output of another, such as by using wired or wireless connections, the network 104 of FIG. 1, instructional steps, process sequence, or a combination thereof. The modules can be coupled directly, without any other intervening structures other than the structure providing the direct connection. The modules can further be coupled indirectly, through a shared connection or other functional structures between the coupled modules.

As a more specific example, one or more outputs of the set-up module 402 can be connected, either directly or indirectly, to one or more inputs of the counter-characteristic module 404 using conductors or wireless communication devices. The counter-characteristic module 404 can similarly be connected to the feature-analysis module 406, which can be similarly connected to the output module 408.

The computing system 100 can operate a device, such as by displaying images, recreating sounds, executing or exchanging process steps or instructions, or a combination thereof with or based on the set-up module 402, the counter-characteristic module 404, the feature-analysis module 406, the output module 408, or a combination thereof. The computing system 100 can also operate the device by having the device perform designated instructions, sending designated instructions to the device, or a combination thereof using one or more of the modules listed above.

The set-up module 402 is configured to prepare data for processing the content information 208 of FIG. 2. The set-up module 402 can prepare data by identifying the target account 228 of FIG. 2, the feature 210 of FIG. 2 therein, or a combination thereof. The set-up module 402 can further prepare data by identifying a comparison set 410.

The comparison set 410 is a set of instances of the content information 208. The comparison set 410 can be instances of the content information 208 available or accessible to the computing system 100, other users, unauthorized users, or a combination thereof. The comparison set 410 can include the feature 210 having the privacy rating 220 of FIG. 2 of the public information 222 of FIG. 2.

The comparison set 410 can include information from the user, other users, or a combination thereof. The comparison set 410 can include information from one or more instances of the social network service 202 of FIG. 2. For example, the comparison set 410 can include the content information 208 from the first social site 204 of FIG. 2, the second social site 206 of FIG. 2, or a combination thereof. The comparison set 410 can include the comparison account 230 of FIG. 2.

The set-up module 402 can identify the comparison set 410 by collecting and organizing information from the social network service 202. The set-up module 402 can organize the content information 208 according to instance of the social network service 202, such as the first social site 204 or the second social site 206, according to the account identification 212 of FIG. 2, or a combination thereof.

For example, the set-up module 402 can identify the comparison set 410 as accounts for the content information 208 within a database accessible or controlled by the computing system 100, or a portion of the accounts therein. Also for example, the set-up module 402 can identify the comparison set 410 based on collecting the public information 222 from the social network service 202 available or accessible using the network 104 of FIG. 1. Also for example, the set-up module 402 can identify the comparison set 410 as a predetermined collection of accounts or links to accounts for the content information 208.

The set-up module 402 can identify instances of the content information 208 for collection according to a rule or a limit predetermined by the computing system 100. The set-up module 402 can further identify instances of the content information 208 for the comparison set 410 based on a random selection element.

The set-up module 402 can identify the target account 228 by recognizing the content information 208 associated with the user for a specific instance of the social network service 202. The set-up module 402 can identify the target account 228 based on a profile or a usage history associated with the user, a user selection, a user-login account or information, or a combination thereof.

For example, the set-up module 402 can identify the target account 228 by using the first communication unit 316 of FIG. 3, the second communication unit 336 of FIG. 3, or a combination thereof to access the social network service 202. The set-up module 402 can use the first communication unit 316, the second communication unit 336, or a combination thereof to access the target account 228 by communicating information, such as sending login information or a request to a specific address associated with the user, receiving the content information 208 associated with the target account 228, or a combination thereof. The set-up module 402 can use the first control unit 312 of FIG. 3, the second control unit 334 of FIG. 3, or a combination thereof to search, match, verify, or a combination thereof for the content information 208 associated with the user for identifying the target account 228.

Also for example, the set-up module 402 can communicate or collect the content information 208, such as sending or receiving information, corresponding to various other users, various instances of the social network service 202, or a combination thereof. The set-up module 402 can use the first communication unit 316, the second communication unit 336, the first control unit 312, the second control unit 334, or a combination thereof to select, identify, collect, arrange, or a combination thereof for the comparison set 410. The set-up module 402 can store the comparison set 410 in the first storage unit 314 of FIG. 3, the second storage unit 346 of FIG. 3, or a combination thereof.

For illustrative purposes, the user can be represented with 'w'. The target account 228 in the first social site 204 can be represented as '$w_1$'. The user can have a separate account represented as '$w_2$' in the second social site 206. The separate account can be included in the comparison set 410. The comparison account 230 can include the separate account. The target account 228 can the separate account can be publically linked or unlinked through the account connection 218 of FIG. 2.

After preparing the data for processing the content information 208, the control flow 400 can be passed to the counter-characteristic module 404. The control flow 400 can pass through a variety of ways. For example, control flow 400 can pass by having processing results of one module passed to another module, such as by passing the target account 228, the comparison set 410, or a combination thereof from the set-up module 402 to the counter-characteristic module 404, by storing the processing results at a location known and accessible to the counter-characteristic module 404, by notifying the counter-characteristic module 404, such as by using a flag, an interrupt, a status signal, or a combination thereof, or a combination of processes thereof.

The counter-characteristic module 404 is configured to calculate a desirable aspect of the content information 208. The counter-characteristic module 404 can calculate the counter rating 262 of FIG. 2. The counter-characteristic module 404 can calculate the counter rating 262 for the target account 228.

The counter-characteristic module 404 can calculate the counter rating 262 using a visibility mechanism 412. The visibility mechanism 412 is a method, a rule, or a sequence of steps for producing the counter rating 262. The visibility mechanism 412 can be predetermined or adjusted by the computing system 100, selected or assigned by the user, or a combination thereof. The visibility mechanism 412 can be represented as '$v_i(w)$'.

The visibility mechanism 412 can include a selection mechanism for the input data, an equation, a lookup table corresponding the input to values, a threshold, or a combination thereof. For example, the visibility mechanism 412 can include a list of the feature 210, a value associated with the feature 210 based on a category thereof, based on a value thereof, or a combination thereof, such as for the account location 214 of FIG. 2 or the account image 216 of FIG. 2.

The counter-characteristic module 404 can calculate the counter rating 262 by calculating a result corresponding to one or more instances of the feature 210 according to the visibility mechanism 412. The counter-characteristic module 404 can set the counter rating 262 as the result corresponding to the feature 210 using the visibility mechanism 412. The counter-characteristic module 404 can also combine the results corresponding to multiple instances of the feature 210 to calculate the counter rating 262.

The counter-characteristic module 404 can use the first control interface 322 of FIG. 3, the second control interface 334 of FIG. 3, the first communication interface 328 of FIG. 3, the second communication interface 350 of FIG. 3, or a combination thereof to access the content information 208 or the feature 210 therein. The counter-characteristic module 404 can also use the first storage interface 324 of FIG. 3, the second storage interface 348 of FIG. 3, or a combination thereof to store the counter rating 262 or access the stored instance of the counter rating 262.

After determining the desirable aspect, the control flow 400 can be passed to the feature-analysis module 406. The control flow 400 can pass similarly as described above between the set-up module 402 and the counter-characteristic module 404, but using the processing results of the counter-characteristic module 404, such as the counter rating 262.

The feature-analysis module 406 is configured to calculate a vulnerability of the content information 208 to an identity attack. The feature-analysis module 406 can calculate the vulnerability by analyzing one or more instance of the feature 210 for the content information 208. The feature-analysis module 406 can use an anonymity threshold 414 for calculating the vulnerability.

The anonymity threshold 414 is a limit for determining a safety or a vulnerability of the content information 208. The anonymity threshold 414 can represent a number of instances of the content information 208 or the feature 210 similar to the target account 228 or the feature 210 therein. The anonymity threshold 414 can also represent a quality or a degree of specificity of the content information 208. The anonymity threshold 414 can be represented as 'k'.

The feature-analysis module 406 can set the anonymity threshold 414 for conforming the target account 228 to other instances of the content information 208. The feature-analysis module 406 can set the anonymity threshold 414 to serve as the limit for achieving k-anonymity, where the attacker will not be able to distinguish user's information from at least 'k' users or units of information. The feature-analysis module 406 can set the anonymity threshold 414 to ensure existence of at least 'k' amount of users or units of information preventing the attacker from inferring a connection between information and the user for the target account 228.

The feature-analysis module 406 can further calculate the vulnerability by calculating the comparison result 248 of FIG. 2 based on the feature 210. The feature-analysis module 406 can calculate the comparison result 248 by determining the feature 210 for processing, compare the feature 210 across the target account 228 and other instances of the content information 208, identify the feature 210 satisfying a condition, or a combination thereof. The feature-analysis module 406 can further calculate the anonymity rating 260 of FIG. 2 based on the comparison result 248.

The feature-analysis module 406 can select the feature 210 for processing by select the feature 210 for the target account 228 for processing. The feature-analysis module 406 can select the feature 210 based on a feature priority 416. The feature priority 416 can be a representation of order, sequence, value, importance, or a combination thereof for the feature 210.

The feature priority 416 can be a classification, a score, a level, a value, a sequential order, or a combination thereof associated with the feature 210. For example, the account identification 212, the account location 214, the account image 216, the account connection 218, or a combination thereof can have an instance of the feature priority 416 associated thereto.

The feature priority 416 can represent a value to the user, a likely value to the attacker, an importance or a significance to the attacking process or the protection process, a likely uniqueness in comparison to other instances of the content information 208, or a combination thereof. The feature priority 416 can be predetermined by the computing system 100, the user, or a combination thereof.

The feature-analysis module 406 can select the feature 210 and calculate the comparison result 248 for the feature 210. The feature-analysis module 406 can calculate the comparison result 248 for multiple instances of the feature 210 based on an order predetermined by the computing system 100 or based on the feature priority 416.

The feature-analysis module 406 can calculate the comparison result 248 by comparing the feature 210 between the target account 228 and the comparison set 410 or the comparison account 230 therein. The feature-analysis module 406 can calculate the comparison result 248 as a result of comparing the target account 228 to one or a select instances of the comparison account 230. The feature-analysis module 406 can also calculate the comparison result 248 as a result of comparing the target account 228 to the comparison set 410, as a whole or using an iterative process.

The feature-analysis module 406 can calculate the comparison result 248 in a variety of ways. For example, the feature-analysis module 406 can calculate the comparison result 248 based on a machine learning mechanism. The feature-analysis module 406 can hide or highlight the feature 210 selected for the processing iteration and calculate the comparison result 248 including a common set 418, a distinctive set 420, or a combination thereof.

The common set 418 is a grouping of accounts or instances of the content information 208 sharing similarities or commonalities with the target account 228. The common set 418 can include instances of the content information 208 including the feature 210 shared with the target account 228 or instances of the content information 208 excluding the feature 210 selected for processing or different from the target account 228.

The distinctive set 420 is a grouping of accounts or instances of the content information 208 having distinctions from the target account 228. The distinctive set 420 can be the comparison set 410 without the common set 418. The common set 418, the distinctive set 420, or a combination thereof can be based on a threshold or a cutoff condition predetermined by the computing system 100.

Continuing with the example, the feature-analysis module 406 can construct the common set 418, the distinctive set 420, or a combination thereof based on the feature 210 using a classifier, a rule, a condition, or a combination thereof. As a more specific example, the feature-analysis module 406 can use an adaptive boosting mechanism, a bootstrap aggregating mechanism, a gradient boosting mechanism, or a combination thereof to process the instances of the content information 208. As a further specific example, the feature-analysis module 406 can use a decision stump for each feature for determining an inference of crossing users.

Also for example, the feature-analysis module 406 can calculate the identification similarity 250 of FIG. 2, the separation distance 252 of FIG. 2, the image comparison result 254 of FIG. 2, the connection result 256 of FIG. 2, or a combination thereof between the target account 228 and the comparison account 230. The feature-analysis module 406 can combine the identification similarity 250, the separation distance 252, the image comparison result 254, the connection result 256, or a combination thereof to calculate the overall assessment 258 of FIG. 2.

Continuing with the example, the feature-analysis module 406 can associate the comparison result 248 to the compared instance of the comparison account 230. The feature-analysis module 406 can iterative select all instances of the content information 208 in the comparison set 410 as the comparison account 230 and calculate the comparison result 248 corresponding to each instance.

Continuing with the example, the feature-analysis module 406 can construct the common set 418 based on a threshold predetermined by the computing system 100 for comparing the overall assessment 258. The common set 418 can include the instances of the content information 208 exceeding, below, equal to, or a combination thereof relative to the predetermined threshold for the comparison result 248.

It has been discovered that the common set 418 and the distinctive set 420 based on processing the feature 210 provides increased security for the user. The common set 418 and the distinctive set 420 based on processing the feature 210 can be the basis for producing k-anonymity for the target account 228, such that the user's identity cannot be inferred based on the content information 208 in the common set 418, the distinctive set 420, or a combination thereof.

It has also been discovered that the common set 418 and the distinctive set 420 based on processing the feature 210 across multiple instances of the social network service 202 provides protection against sophisticated attacks. The common set 418 and the distinctive set 420 based on processing the feature 210 across multiple instances of the social network service 202 can prevent the attacker from inferring the connection between multiple accounts and information used for different sites or purposes. The prevention of inference can prevent the attacker from gaining a comprehensive set of information regarding the user, which can be used for identity theft.

Also for example, the feature-analysis module 406 can use a matching score mechanism 422 to calculate the comparison result 248. The matching score mechanism 422 is a method, a rule, or a sequence of steps for determining an amount of distinction between users, instances of the content information 208, or a combination thereof. The matching score mechanism 422 can quantify the distinction or differences between users, instances of the content information 208, or a combination thereof.

The matching score mechanism 422 can be represented as:

$$m(\cdot,\cdot) = \Sigma_j \alpha_j h_j[f(\cdot,\cdot)] = \Sigma_i \beta_i(\cdot,\cdot).$$  Equation (1).

The term '$\alpha_j$' can represent a weight of each weak learner returned by the adaptive boosting mechanism. The term $h_j[f(\cdot,\cdot)]$ can represent a class obtained from the comparison of the weaker learner 'j' between users returned by a decision stump classifier.

The matching score mechanism 422 can be represented with 'm' and '$\beta_i(w_1, w_2)$' can represent a weight returned by the adaptive boosting classifier for feature 'i' between users $w_1$ and $w_2$. The feature-analysis module 406 can use a representation of the user, the target account 228, the comparison account 230, or a combination thereof as input for the matching score mechanism 422 and calculate the comparison result 248 as an output.

As a more specific example, the feature-analysis module 406 can calculate the comparison result 248 adaptive boosting classifier. The feature-analysis module 406 can calculate the comparison result 248 based on existence of at least k users, called $V_2^k$, in the second social site 206, satisfying:

$$m(w_1, w_2) \le m(w_1, u) \forall u \in V_2^k.$$  Equation (2).

The feature-analysis module 406 can calculate the anonymity rating 260 based on the selected instance of the feature 210, the common set 418, the distinctive set 420, or a combination thereof for comparing the target account 228 to one or more instances of the comparison account 230. For example, the feature-analysis module 406 can calculate the anonymity rating 260 based on a weight result corresponding to the feature 210 generated based on the common set 418, the distinctive set 420, or a combination thereof. Also for example, the feature-analysis module 406 can calculate the anonymity rating 260 based on a size, a number of instances of the content information 208 in the common set 418 or the distinctive set 420.

The feature-analysis module 406 can compare the anonymity rating 260 to the anonymity threshold 414. The feature-analysis module 406 can determine that the selected instance of the feature 210 can provide k-anonymity when the anonymity rating 260 satisfies the anonymity threshold 414, such as the anonymity rating 260 equal to or greater than the anonymity threshold 414.

The feature-analysis module 406 can select a different or an additional instance of the feature 210 and repeat the process described above. For example, the feature-analysis module 406 can reconstruct or adjust the common set 418 and the distinctive set 420 based on the different instance or the additional instance of the feature 210. Also for example, the feature-analysis module 406 can recalculate the anonymity rating 260.

It has been discovered that the anonymity rating 260 based on the common set 418 and the distinctive set 420 provides increased robustness and wider application. The anonymity rating 260 based on the common set 418 and the distinctive set 420 can be independent of categorization or actual value of the feature 210 in the target account 228. The computing system 100 providing protection based on similarities and differences using the common set 418 and the distinctive set 420 can be feature-independent.

The feature-analysis module 406 can pass the feature 210 or a collection of the feature 210 satisfying the anonymity threshold 414 to the counter-characteristic module 404. The counter-characteristic module 404 can calculate the counter rating 262 corresponding to the feature 210 or a collection of the feature 210. The counter-characteristic module 404 can calculate the counter rating 262 corresponding to the target account 228 excluding the feature 210 or a collection of the feature 210.

The feature-analysis module 406 can determine one or more instances of the feature 210 based on the comparison result 248 and the anonymity threshold 414. The feature-analysis module 406 can determine one or more instances of the feature 210 for the target account 228 maximizing the counter rating 262 and satisfying the anonymity threshold 414 for determining the feature 210 for the target account 228.

For example, the feature-analysis module 406 can determine one or more instances of the feature 210 maximizing '$1(\beta_i(w_1, w_2) - \beta_i(w_1, u))/V_i$'. Here $1(x)=1$ if $x \ge 0$ and $1(x)=0$ otherwise. The term '$V_i$' can represent the counter rating 262 for the feature 'i'.

The feature-analysis module 406 can use the first control unit 312, the second control unit 534, or a combination thereof to calculate the vulnerability of the content information 208, including setting the anonymity threshold 414, calculating the comparison result 248, calculating the anonymity rating 260, determining the feature 210, or a combination thereof. The feature-analysis module 406 can store the anonymity threshold 414, the comparison result 248, the anonymity rating 260, the determined instance of the feature 210, or a combination thereof in the first storage unit 314, the second storage unit 346, or a combination thereof.

It has been discovered that the feature 210 determined based on the comparison result 248 and the anonymity threshold 414 provides increased security for the user. The feature 210 determined based on the comparison result 248 and the anonymity threshold 414 provides can be the basis for producing k-anonymity for the target account 228, such that the user's identity cannot be inferred based on the feature 210 or a lack thereof.

It has further been discovered that the feature 210 determined based on the comparison result 248 and the counter rating 262 provides preservation of qualities or characteristics desirable to the user while maintaining k-anonymity. The computing system 100 can use the counter rating 262 to balance the desirable quality or characteristic and maximize such, while achieving k-anonymity with the comparison result 248.

After calculating the vulnerability of the content information 208, the control flow 400 can be passed to the output module 408. The control flow 400 can pass similarly as described above between the set-up module 402 and the counter-characteristic module 404, but using the processing results of the feature-analysis module 406, such as the anonymity threshold 414, the comparison result 248, the anonymity rating 260, the determined instance of the feature 210, or a combination thereof.

The output module 408 is configured to generate and implement the protective solution 264 of FIG. 2 for protecting the user's information from unauthorized access or hacking attempts. The output module 408 can generate and implement the protective solution 264 based on one or more instances of the feature 210 for the target account 228 determined by the feature-analysis module 406. The output module 408 can implement the protective solution 264 for the target account 228 for conforming the target account 228 to one or more instances of the comparison account 230 for achieving k-anonymity.

The output module 408 can generate the protective solution 264 in a variety of ways. For example, the output module 408 can generate the protective solution 264 including the content mask 268 of FIG. 2. The output module 408 can generate the protective solution 264 including the content mask 268 for hiding the feature 210 from the target account 228 or another instance of the content information 208 belonging to the user. The content mask 268 can be for conforming the target account 228 to one or more instances of the comparison account 230.

Continuing with the example, the output module 408 can generate the content mask 268 by changing or increasing the privacy rating 220 associated with the feature 210 determined by the feature-analysis module 406, such as from the public information 222 to the selective information 224 of FIG. 2 or from the selective information 224 to the private information 226 of FIG. 2. The output module 408 can also generate the content mask 268 by hiding, not displaying, or deleting the feature 210 in the target account 228, generating a set of instructions or a notice for hiding, not displaying, or deleting the feature 210 in another instance of the content information 208 belonging to the user.

It has been discovered that the protective solution 264 including the content mask 268 provides increased protection for the user's information. The content mask 268 can hide information having value or importance for the attacking process. The content mask 268 can increase security and remove information from public access while retaining access to desired parties.

Also for example, the output module 408 can generate the protective solution 264 including the replacement content 266 of FIG. 2. The output module 408 can generate the replacement content 266 corresponding to the feature 210 for conforming the target account 228 with one or more of the comparison account 230.

Continuing with the example, the output module 408 can generate the replacement content 266 using a synonym, a more general or a higher categorical information, or a combination thereof corresponding to the feature 210 determined by the feature-analysis module 406. The output module 408 can use an instance of the synonym or the generalization as determined by the computing system 100 and providing k-anonymity using above described process.

As a more specific example, a more generic job description or a career category can replace an official job title or a place of location. Also as a more specific example, a name of a larger region can replace the exact or the specified location information. Also as a more specific example, unique key words used in the description or user provided content can be replaced with synonyms.

It has been discovered that the protective solution 264 including the replacement content 266 provides increased protection for the user's information. The content mask 268 can replace information in the target account 228 or other instances of the content information 208 associated with the user for achieving k-anonymity. The content mask 268 can increase security while maintaining a portion or a form of originally intended information, preserving user's original intent.

The output module 408 can generate the protective solution 264 maximizing the counter rating 262. The output module 408 can generate the protective solution 264 maximizing the counter rating 262 by processing one or more instances of the feature 210 determined by the feature-analysis module 406 while maximizing the counter rating 262.

It has been discovered that the protective solution 264 based on the comparison result 248 and the counter rating 262 provides preservation of qualities or characteristics desirable to the user while maintaining k-anonymity. The computing system 100 can use the counter rating 262 to balance the desirable quality or characteristic and maximize such, while achieving k-anonymity with the comparison result 248.

The output module 408 can generate the protective solution 264 for implementing the protective solution 264 for the social network service 202, the first device 102, the second device 106, or a combination thereof. For example, the computing system 100 can generate, implement, or a combination thereof for the protective solution 264 at the first social site 204, the second social site 206, the first device 102, such as a client device, the second device 106, such as a server, or a combination thereof. As a more specific example, the output module 408 can generate the protective solution 264 based on the target account 228 on the first social site 204 for implementing the protective solution 264 on the first social site 204, the second social site 206, the first device 102, the second device 106, or a combination thereof.

It has been discovered that the protective solution 264 based on the comparison result 248 provides increased protection for user's information. The protective solution 264 based on the comparison result 248 provides k-anonymity using quantitative and accurate data. The computing system 100 can systematically protect various key information of the user, such as a user's group information, interest, check-in or location information, event, point of interest, or a combination thereof.

The output module 408 can implement the protective solution 264 by operating the first device 102, the second device 106, or a combination thereof, such as by displaying images, recreating sounds, executing or exchanging process steps or instructions, or a combination thereof for the target account 228, the replacement content 266, the content mask 268, or a combination thereof. The computing system 100 can operate the first device 102, the second device 106, or a combination thereof by having the device perform designated instructions, sending designated instructions to the device, or a combination thereof.

For example, the computing system 100 can displaying images, recreating sounds, executing or exchanging process steps or instructions, or a combination thereof according to the target account 228, the protective solution 264, or a combination thereof. Also as an example of the control flow 400, the first device 102, the second device 106, the social network service 202, or a combination thereof can include an application, a hardware implementation, or a combination thereof for the set-up module 402, the counter-characteristic module 404, the feature-analysis module 406, the output module 408, or a combination thereof.

Figure 5:
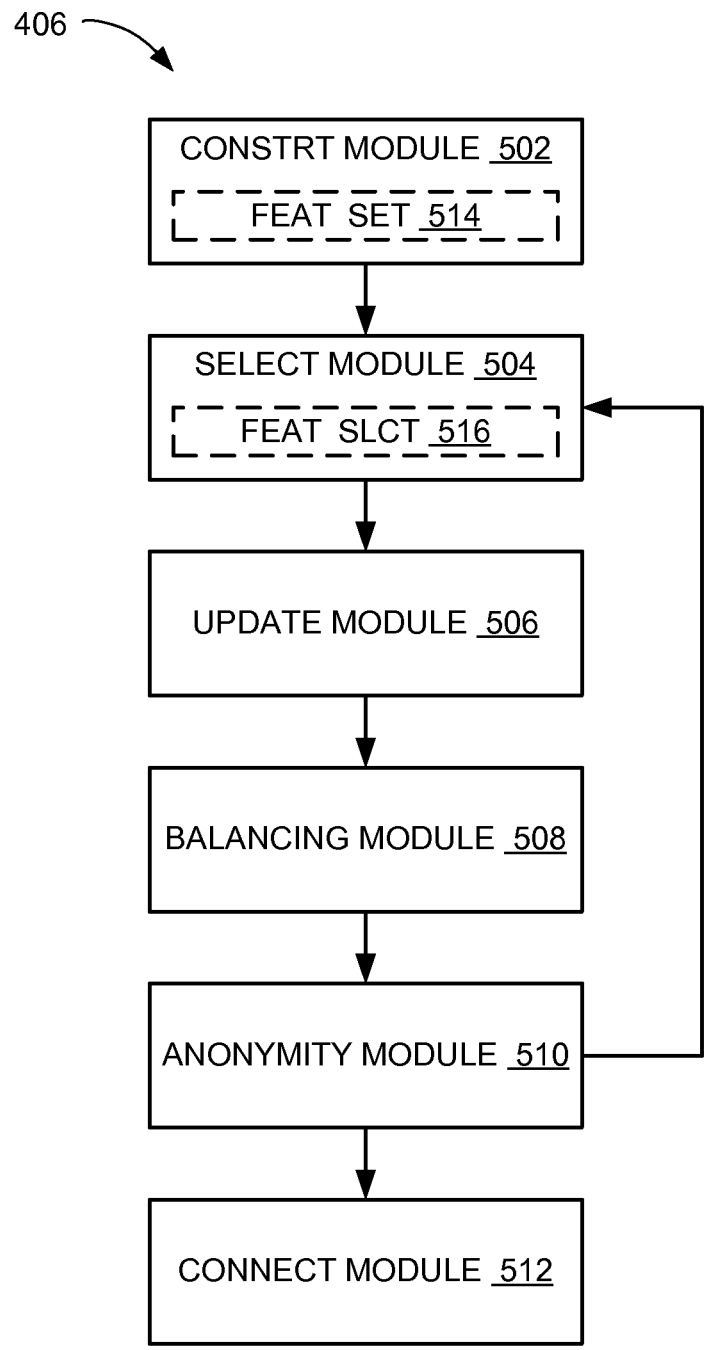
FIG. 5 is a detailed flow of the feature-analysis module.

Referring now to FIG. 5, therein is shown a detailed flow of the feature-analysis module 406. The feature-analysis module 406 can include a construct module 502, a selection module 504, an update module 506, a balancing module 508, an anonymity module 510, a connection module 512, or a combination thereof.

The construct module 502 can be coupled to the selection module 504, which can be coupled to the update module 506. The update module 506 can be coupled to the balancing module 508, which can be further coupled to the anonymity module 510. The anonymity module 510 can be coupled to the connection module 512.

The construct module 502 is configured to construct the common set 418 of FIG. 4, the distinctive set 420 of FIG. 4, a feature set 514, or a combination thereof. The feature set 514 can be a grouping of the feature 210 for processing by the computing system 100 of FIG. 1.

The construct module 502 can construct the feature set 514 by selecting one or more instances of the feature 210. The construct module 502 can construct the feature set 514 based on the feature priority 416, a method or a grouping predetermined by the computing system 100, or a combination thereof.

The construct module 502 can construct the common set 418, the distinctive set 420, or a combination thereof by comparing the target account 228 of FIG. 2 to the comparison set 410 of FIG. 4 or the comparison account 230 of FIG. 2 therein according to the feature set 514. The construct module 502 can include one or more instances of the content information 208 of FIG. 2 having the feature set 514 therein similar, identical, or different in comparison to that of the target account 228 in the common set 418 or the distinctive set 420.

The construct module 502 can construct the common set 418, the distinctive set 420, or a combination thereof based on the comparison result 248 of FIG. 2. As an example, the construct module 502 can use the adaptive boosting mechanism to obtain one or more weights corresponding to instances of the feature 210 in the feature set 514. Also as an example, the construct module 502 can calculate the comparison result 248 between the target account 228 and the comparison set 410, or the comparison account 230 therein, for instances of the feature 210 in the feature set 514.

The selection module 504 is configured to select feature selection 516 as one or more instances of the feature 210 from the feature set 514. The selection module 504 can select the feature selection 516 as described above. For example, the selection module 504 can select the feature selection 516 for processing based on the feature priority 416, a method or a sequence predetermined by the computing system 100, or a combination thereof.

The update module 506 is configured to reconstruct the common set 418, the distinctive set 420, or a combination thereof based on the selection for the feature 210. The update module 506 can hide the feature selection 516 in the feature set 514. The update module 506 can reconstruct the common set 418, the distinctive set 420, or a combination thereof based the feature set 514 excluding the feature selection 516.

The update module 506 can reconstruct the common set 418, the distinctive set 420, or a combination thereof similarly as described above, such as using the comparison result 248 or the machine-learning mechanism.

The balancing module 508 is configured to determine the counter rating 262 of FIG. 2 corresponding to the feature set 514 of the target account 228. The balancing module 508 can pass the feature set 514 to the counter-characteristic module 404 of FIG. 4 and receive the counter rating 262 resulting from the counter-characteristic module 404.

The anonymity module 510 is configured to evaluate the protection given by the feature set 514 excluding the feature selection 516. The anonymity module 510 can calculate the anonymity rating 260 of FIG. 2 corresponding to the target account 228 including the feature set 514 without the feature selection 516. The anonymity module 510 can calculate the anonymity rating 260 as described above.

The anonymity module 510 can compare the anonymity rating 260 to the anonymity threshold 414 of FIG. 4. If the anonymity rating 260 does not satisfy the anonymity threshold 414, indicating failure to reach the k-anonymity for the user or the target account 228, the anonymity module 510 can pass the control flow to the selection module 504 for increasing the feature selection 516 with an additional or a different instance of the feature 210 from the feature set 514.

The anonymity module 510 can determine the feature 210 for further processing as the instance of the feature set 514 or a corresponding instance of the feature selection 516 satisfying the anonymity threshold 414. The anonymity module 510 can further repeat the above described process for individual or combinations of the feature 210 in the feature set 514.

The anonymity module 510 can analyze the counter rating 262 for instances of the feature set 514 satisfying the anonymity threshold 414. The anonymity module 510 can select the instance of the feature set 514 or a corresponding instance of the feature selection 516 having the highest or the lowest instance of the counter rating 262 among the instances satisfying the anonymity threshold 414. The anonymity module 510 can determine the feature 210 as the feature set 514 or a corresponding instance of the feature selection 516 satisfying the anonymity threshold 414 and maximizing the benefit of the counter rating 262.

The connection module 512 is configured to manage the account connection 218 of FIG. 2. The connection module 512 can determine a specific instance of the target connection 238 of FIG. 2 or the account connection 218 in a different instance of the content information 208 associated with the user for processing for the protective solution 264 of FIG. 2.

The connection module 512 can test on inferred crossing with the comparison set 410 or the comparison account 230 therein for each instance of the target connection 238. The connection module 512 can calculate an influence measure corresponding to each instance of the target connection 238 as a result of testing the inferred crossing. The connection module 512 can select the target connection 238 having the highest influence, such that the summation of visibility of itself and all users can be inferred with the target connection 238 but cannot be inferred without the target connection 238.

The connection module 512 can pass the determined instance of the feature 210, such as from the feature set 514 or the feature selection 516, the determined instance of the target connection 238 having the highest influence, or a combination thereof to the output module 408 of FIG. 4. The output module 408 can generate the protective solution 264 as described above. The computing system 100 can reprocess the target account 228 after implementing the protective solution 264 to further adjust the protective solution 264.

The modules described herein can be hardware implementation or hardware accelerators, including passive circuitry, active circuitry, or both, in first communication unit 316, the second communication unit 336, the first control unit 312, the second control unit 334, or a combination thereof. The modules can also be hardware implementation or hardware accelerators, including passive circuitry, active circuitry, or both, within the first device 102 or the second device 106, but outside of the first communication unit 316, the second communication unit 336, the first control unit 312, the second control unit 334, or a combination thereof.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 314, the second storage unit 346, or a combination thereof can represent the non-transitory computer readable medium. The first storage unit 314, the second storage unit 346, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation from the comparison result 248, the anonymity rating 260, the comparison result 248, or a combination thereof results in the movement in the physical world, such as information displayed or presented to other users. The accessible information can influence the user's movement, such as interacting with other users or availing contact or information to other users. Movement in the physical world results in changes to the account connection 218 or the privacy rating 220, which can be fed back into the computing system 100 to further process the comparison result 248, the anonymity rating 260, the comparison result 248, or a combination thereof.

The control flow 400 or the method 400 of operation of the computing system 100 includes: accessing a target account including a feature; calculating a comparison result based on the feature; setting an anonymity threshold for conforming the target account with a comparison account; and determining the feature for the target account based on the comparison result and the anonymity threshold for displaying on a device.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
   a communication unit, including microelectronics, configured to access content information, including a feature, of a target account of a user on a first social site;
   a control unit, including a processor, coupled to the communication unit, configured to:
   calculate a counter rating for the target account, wherein the counter rating includes a representation of a characteristic of the feature adversely related to an anonymity rating,
   calculate a comparison result as an amount of distinction between the target account and a comparison account of the user on a second social site based on the feature, wherein the amount of distinction between the target account and the comparison account is less than or equal to an amount of distinction between the target account and an account of a different user on the second social site,
   determine an anonymity threshold for conforming the target account with the comparison account,
   determine the feature for the target account based on the counter rating, the comparison result, and the anonymity threshold for displaying on a device to achieve k-anonymity for the target account, and
   implement a protective solution based on the comparison result for protecting the content information, including the feature, from unauthorized access.

2. The system as claimed in claim 1 wherein the control unit is configured to generate the protective solution based on the feature for the target account for conforming the target account with the comparison account.

3. The system as claimed in claim 1 wherein the control unit is configured to:
   construct a common set based on the feature for calculating the comparison result; and
   calculate the anonymity rating based on the common set for comparing the target account to one or more instances of the comparison account.

4. The system as claimed in claim 1 wherein the control unit is configured to maximize the counter rating for determining the feature for the target account.

5. The system as claimed in claim 1 wherein the control unit is configured to determine the feature for conforming the target account based on the feature across multiple instances of social network services.

6. The system as claimed in claim 1 wherein the control unit is configured to generate the protective solution including a replacement content corresponding to the feature for conforming the target account with the comparison account.

7. The system as claimed in claim 1 wherein the control unit is configured to generate the protective solution including a content mask for hiding the feature for conforming the target account with the comparison account.

8. The system as claimed in claim 1 wherein the control unit is configured to generate the protective solution for implementing the protective solution for a social network service, the device, or a combination thereof.

9. The system as claimed in claim 1 wherein the control unit is configured to generate the protective solution based on the first social site for implementing the protective solution on the target account on the second social site.

10. The system as claimed in claim 1 wherein the control unit is configured to generate the protective solution maximizing the counter rating for conforming the target account with the comparison account.

11. A method of operation of a computing system comprising:
  accessing content including a feature, of a target account of a user on a first social site;
  calculating a counter rating for the target account, wherein the counter rating includes a representation of a characteristic of the feature adversely related to an anonymity rating;
  calculating a comparison result as an amount of distinction between the target account and a comparison account of the user on a second social site based on the feature, wherein the amount of distinction between the target account and the comparison account is less than or equal to an amount of distinction between the target account and an account of a different user on the second social site,
  determining an anonymity threshold for conforming the target account with the comparison account;
  determining the feature, with a processor, for the target account based on the counter rating, the comparison result, and the anonymity threshold for displaying on a device to achieve k-anonymity for the target account; and
  implementing a protective solution based on the comparison result for protecting the content information, including the feature, from unauthorized access.

12. The method as claimed in claim 11 further comprising generating the protective solution based on the feature for the target account for conforming the target account with the comparison account.

13. The method as claimed in claim 11 wherein calculating the comparison result includes:
  constructing a common set based on the feature for calculating the comparison result; and
  calculating the anonymity rating based on the common set for comparing the target account to one or more instances of the comparison account.

14. The method as claimed in claim 11 further comprising maximizing the counter rating for determining the feature for the target account.

15. The method as claimed in claim 11 wherein determining the feature includes determining the feature for conforming the target account based on the feature across multiple instances of social network services.

16. A non-transitory computer readable medium including instructions executable by a processor, the instructions comprising:
  accessing content information, including a feature, of a target account of a user on a first social site;
  calculating a counter rating for the target account, wherein the counter rating includes a representation of a characteristic of the feature adversely related to an anonymity rating;
  calculating a comparison result as an amount of distinction between the target account and a comparison account of the user on a second social site based on the feature, wherein the amount of distinction between the target account and the comparison account is less than or equal to an amount of distinction between the target account and an account of a different user on the second social site,
  determining an anonymity threshold for conforming the target account with the comparison account;
  determining the feature, with the processor, for the target account based on the counter rating, the comparison result, and the anonymity threshold for displaying on a device to achieve k-anonymity for the target account; and
  implementing a protective solution based on the comparison result for protecting the content information, including the feature, from unauthorized access.

17. The non-transitory computer readable medium as claimed in claim 16, wherein the instructions further comprise generating the protective solution based on the feature for the target account for conforming the target account with the comparison account.

18. The non-transitory computer readable medium as claimed in claim 16 wherein calculating the comparison result includes:
  constructing a common set based on the feature for calculating the comparison result; and
  calculating the anonymity rating based on the common set for comparing the target account to one or more instances of the comparison account.

19. The non-transitory computer readable medium as claimed in claim 16, wherein the instructions further comprise maximizing the counter rating for determining the feature for the target account.

20. The non-transitory computer readable medium as claimed in claim 16 wherein determining the feature includes determining the feature for conforming the target account based on the feature across multiple instances of social network services.

* * * * *